(12) United States Patent
Shioda et al.

(10) Patent No.: US 6,813,508 B1
(45) Date of Patent: Nov. 2, 2004

(54) APPARATUS AND METHOD FOR MOBILE COMMUNICATION

(75) Inventors: Takehiko Shioda, Tsurugashima (JP); Katsunori Arakawa, Tsurugashima (JP); Osamu Yamazaki, Tsurugashima (JP); Masami Suzuki, Tsurugashima (JP); Yasuteru Kodama, Tsurugashima (JP); Manabu Nohara, Tsurugashima (JP); Hiroto Inoue, Tsurugashima (JP); Masahiro Okamura, Tsurugashima (JP); Takayuki Akimoto, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 7 days.

(21) Appl. No.: 09/671,601

(22) Filed: Sep. 28, 2000

(30) Foreign Application Priority Data

Oct. 1, 1999 (JP) .......................................... 11-281527

(51) Int. Cl.[7] .................................................. H04Q 7/20
(52) U.S. Cl. ...................... 455/525; 455/436; 455/440; 455/441; 455/442; 370/332
(58) Field of Search ............................... 455/422, 425, 455/432, 434, 436, 437, 440, 441, 442, 456, 513, 67.1; 370/332

(56) References Cited

U.S. PATENT DOCUMENTS

| | | | | |
|---|---|---|---|---|
| 5,754,958 A | * | 5/1998 | Tsuji et al. | 455/436 |
| 5,898,926 A | * | 4/1999 | Konishi | 455/441 |
| 6,064,890 A | * | 5/2000 | Hirose et al. | 455/513 |
| 6,351,642 B1 | * | 2/2002 | Corbett et al. | 455/442 |
| 6,400,953 B1 | * | 6/2002 | Furukawa | 455/442 |

FOREIGN PATENT DOCUMENTS

| | | |
|---|---|---|
| DE | 19741701 A1 | 3/1999 |
| GB | 2271486 | 4/1994 |
| WO | WO0038466 | 6/2000 |

OTHER PUBLICATIONS

IEICE Trans. Communication., "A Dynamic Channel Assignment Strategy using Information on Speed and Moving Direction for Micro Cellular Systems", vol. E79–B, No. 3, Mar. 1996.

* cited by examiner

*Primary Examiner*—Edward F. Urban
*Assistant Examiner*—Simon Nguyen
(74) *Attorney, Agent, or Firm*—Morgan, Lewis & Bockius, LLP

(57) ABSTRACT

A mobile communication apparatus and method which extract surrounding base stations within a certain defined area centered at a present location of a mobile unit, carry out an arithmetic operation for obtaining a specified weighting coefficient with respect to each of the extracted surrounding base stations on the basis of a direction of each of the extracted surrounding base stations from the present location of the mobile unit and a traveling direction of the mobile unit carry out a further arithmetic operation for weighting a value of the electric field strength of a signal recieved from each of the surrounding base stations with the weighting coefficient of a corresponding surrounding base station to provide a weighted electric field strength of each of the extracted surrounding base station, and select the one base station from the extracted surrounding base stations depending on a value of the weighted electric field strength.

9 Claims, 8 Drawing Sheets

| SURROUNDING BASE STATION ID | PRIORITY WEIGHT |
|---|---|
| BS-C | 0.8 |
| BS-D | 0.6 |
| BS-A | 0.6 |
| BS-G | 0.5 |
| BS-E | 0.4 |

FIG. 9B

| SURROUNDING BASE STATION ID | ELECTRIC FIELD STRENGTH |
|---|---|
| BS-A | 80 |
| BS-C | 80 |
| BS-D | 80 |
| BS-E | 70 |
| BS-G | 60 |

FIG. 9C

| SURROUNDING BASE STATION ID | ELECTRIC FIELD STRENGTH | PRIORITY WEIGHT | WEIGHTED ELECTRIC FIELD STRENGTH | HANDOVER PRIORITY |
|---|---|---|---|---|
| BS-A | 80 | 0.6 | 48 | 2 |
| BS-C | 80 | 0.8 | 64 | 1 |
| BS-D | 80 | 0.6 | 48 | 2 |
| BS-E | 70 | 0.4 | 28 | |
| BS-G | 60 | 0.5 | 30 | |

FIG.10

APPARATUS AND METHOD FOR MOBILE COMMUNICATION

BACKGROUND OF THE INVENTION

1. Field of the Invention

The present invention relates to an apparatus and method for mobile communication in which a base station for favorable communications is selected from a plurality of base stations.

2. Description of the Related Art

A system known as CDMA (Code Division Multiple Access) has been employed in a mobile communication apparatus. For example, in a CDMA mobile communication system, a base station is disposed in each of a plurality of service area (cells) so that wireless asynchronous communications are carried out between the base station and a communication apparatus (portable information apparatus) of a user.

Figure 1:
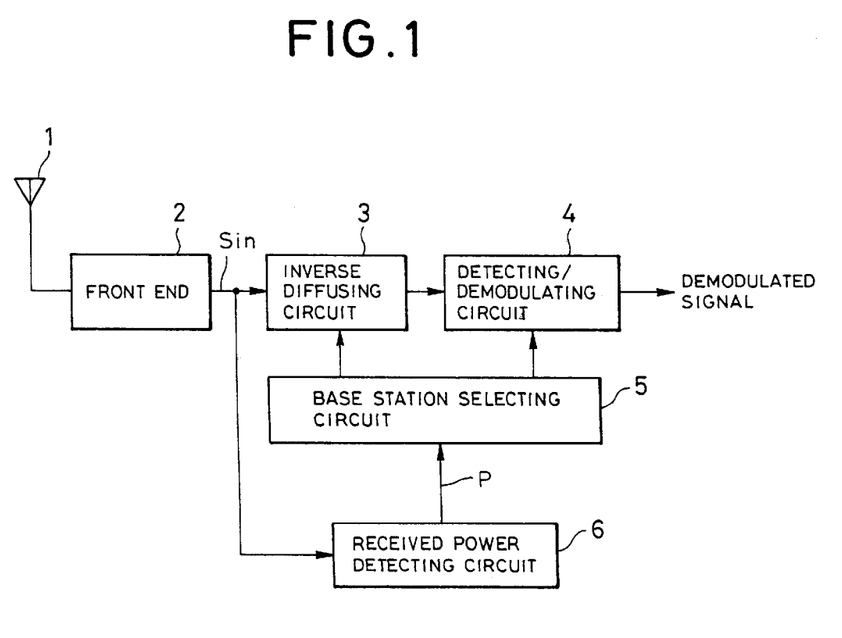
FIG. 1 is a block diagram showing a configuration of a conventional portable information apparatus.

A portable information apparatus that has been used until now is provided with a receiving circuit as shown in FIG. 1 which selects one base station among a plurality of base stations for satisfactory communications. The receiving circuit is provided with an antenna 1, a front end 2, an inverse diffusing circuit 3, a detecting/demodulating circuit 4, a base station selecting circuit 5, and a received power detection circuit 6. The antenna 1 and the front end 2 receive a radio wave in a down channel arrived from a base station. A received signal Sin output from the front end 2 is inverse-diffused in the inverse diffusing circuit 3. The inverse-diffused signal is further detected and decoded in the detecting/demodulating circuit 4, by which a demodulated signal is produced. Furthermore, the received power detection circuit 6 automatically measures electric power of a received signal Sin. The base station selecting circuit 5 determines a base station transmitting a radio wave with the largest measured power P as the station to communicate with, and, on the basis of a result of the determination, controls the inverse diffusing circuit 3 and detecting/demodulating circuit 4.

Figure 2:
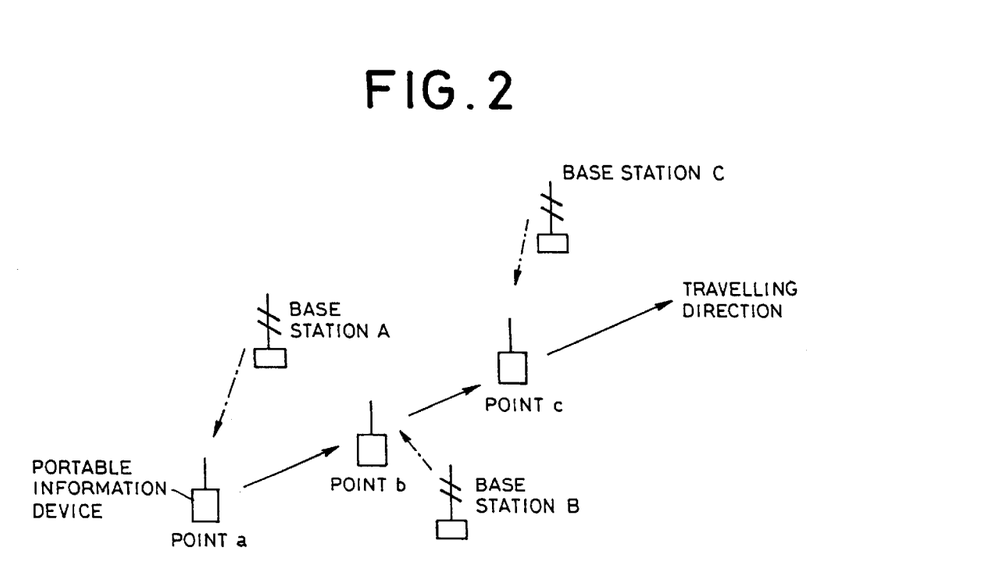
FIG. 2 is a schematic diagram illustrating handover of the portable information apparatus shown in FIG. 1 traveling with a user thereof.

With thus provided received power detection circuit 6 and base station selecting circuit 5 for the base station selection, even when the portable information apparatus travels with the user from a point a, to a point b, then to a point c, and so on, as illustrated in FIG. 2, a handover (cell switching) of the portable information apparatus is carried out in the order of a base station A, B, and C, and so on, each of which is at the shortest distance from the apparatus in the traveling direction of the user. It is possible to maintain suitable communication even if the user is traveling.

In the above base station selection, of radio waves arriving from a plurality of base stations, one radio wave with the highest electric field strength is detected. Then, a base station transmitting the detected radio wave is determined to be selected as the nearest suitable base station in the traveling direction.

Figure 3:
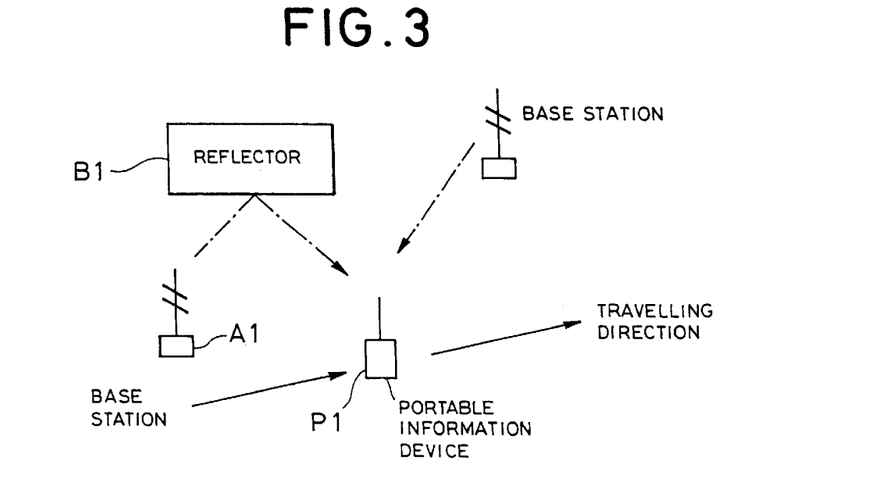
FIG. 3 is a schematic diagram showing repetition of unnecessary handover of the portable information apparatus shown in FIG. 1 traveling with the user thereof.

However, as shown in FIG. 3, a radio wave transmitted from a base station A1 behind a portable information apparatus P1 which is traveling is reflected by a reflector B1 such as a building. As a result, the portable information apparatus P1 can receive the reflected radio wave with a high electric field strength. Therefore, in the above base station selection which is strongly dependent on electric field strength of a radio wave of a base station, the reflected radio wave is incorrectly determined as a radio wave transmitted from the nearest base station in the traveling direction. This causes frequent repetition of unnecessary handover that results in ineffective utilization of limited resource and of occurrence of undesirable disconnection that degrades communication quality.

SUMMARY OF THE INVENTION

In view of the foregoing, it is an object of the present invention to provide a mobile communication apparatus and method by which occurrences of unnecessary handovers can be reduced to improve communication quality.

The mobile communication apparatus according to the present invention selects any one of a plurality of base stations to communicate therewith, the apparatus comprising: extracting means for extracting surrounding base stations of a mobile unit within a certain defined area centered at a present location of the mobile unit; and base station selecting means for carrying out an arithmetic operation for obtaining a specified weighting coefficient with respect to each of the extracted surrounding base stations on the basis of a direction of each of the extracted surrounding base stations from the present location of the mobile unit and a traveling direction of the mobile unit, for carrying out further arithmetic operation for weighting a value of the electric field strength of a signal received from each of the surrounding base stations with the weighting coefficient of a corresponding surrounding base station to provide a weighted electric field strength of each of the extracted surrounding base station, and for selecting the one base station from the extracted surrounding base stations depending on a value of the weighted electric field strength.

The mobile communication apparatus according to the present invention selects any one of a plurality of base stations to communicate therewith, the apparatus comprising: a receiving section for receiving a radio wave transmitted from a satellite at a fixed time interval, and for outputting present location data in synchronism with the time interval; a present location storing section for storing the present location data supplied from the receiving section; an operation section into which location information indicating a destination is input as destination data by a user; a map information storing section for storing map information including location data of each of base stations settled in each of service areas; a traveling direction estimating section for estimating a traveling direction in which the user is going to travel, and for outputting the estimated direction as estimation direction data; and a candidate base station selecting section which receives the estimation direction data output from the traveling direction estimating section; retrieves base station location data about all of the base stations in an area within a specified radius centered at the present location from the map data storing section on the basis of the present location data; carries out an arithmetic operation for obtaining a direction of each of the base stations as a direction of a vector with an initial point thereof at a point represented by the present location data and a terminal point thereof at a point represented by a retrieved base station location data of each of the base stations, the direction of the vector being defined as a base station deflection angle which is an angle between the vector and the axis of the coordinate system; carries out an arithmetic operation for comparing each of the obtained base station deflection angles with the destination deflection angle, for obtaining weighting coefficients each corresponding to each of the base stations and providing a higher priority of being made as a candidate of the one base station for a base station with the base station deflection angle closer to the destination deflection angle, and for weighting a value of an electric field strength of a signal received from each of surrounding base stations with the corresponding weighting coefficient to provide a weighted electric field strength for each of base stations; and selects the one base station depending on a value of the weighted electric field strength.

A method for communication used in a mobile communication system according to the present invention selects any one of a plurality of base stations to communicate with a mobile unit, the method comprising the steps of: inputting a traveling destination of the mobile unit; detecting a present location of the mobile unit at a fixed time interval; carrying out an arithmetic operation for obtaining a weighting coefficient for each of base stations, the weighting coefficient being provided so that a base station at the shortest distance from the mobile unit in a traveling direction thereof is made as a candidate of the one base station; carrying out an arithmetic operation for weighting a value of an electric field strength of a signal received from each of surrounding base stations with the corresponding weighting coefficient to provide a weighted electric field strength for each of base stations; and selecting the one base station depending on a value of the weighted electric field strength.

DESCRIPTION OF THE PREFERRED EMBODIMENT

An embodiment according to the present invention will be explained in detail in the following with reference to drawings.

Figure 4:
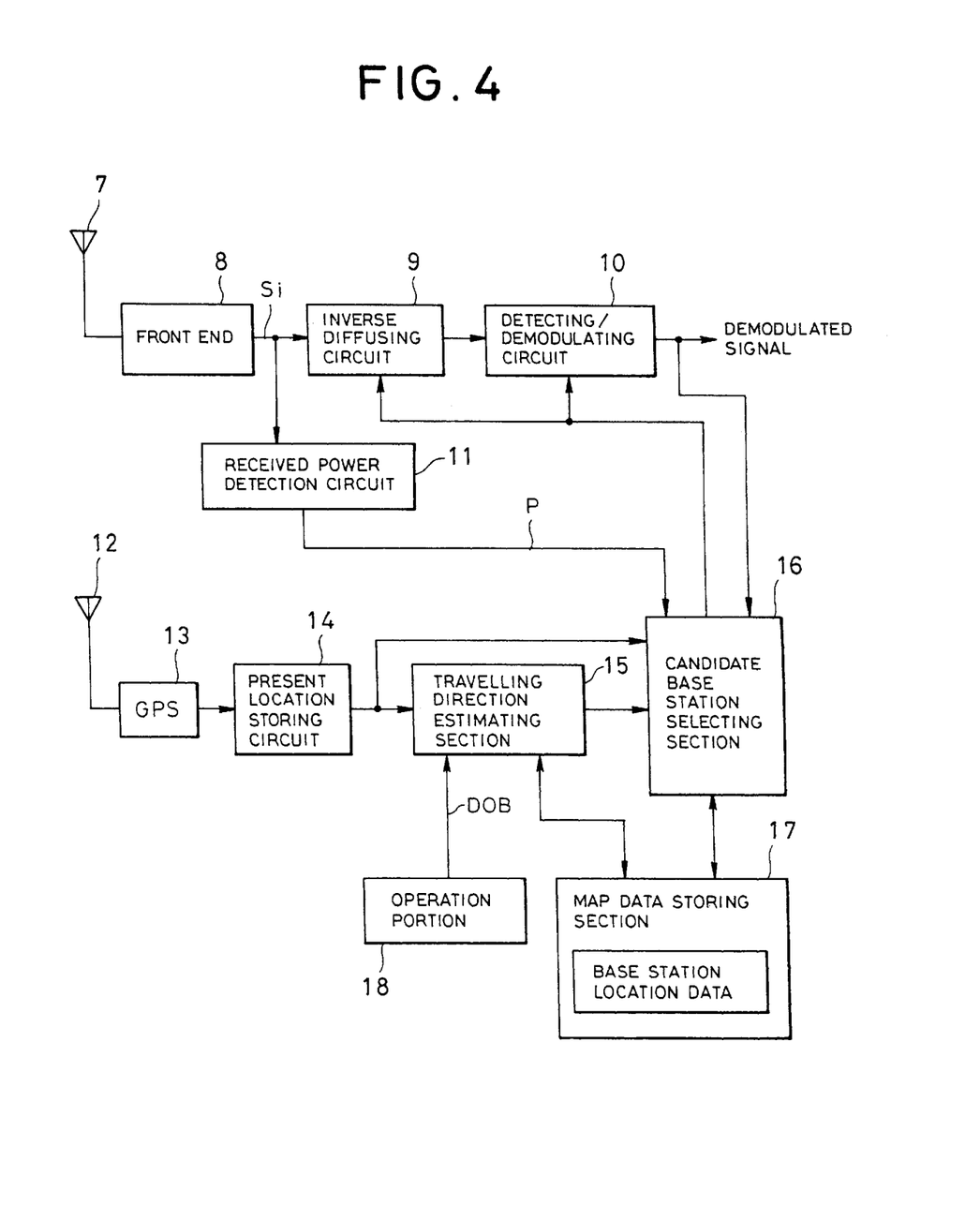
FIG. 4 is a block diagram showing an embodiment of a configuration of a portable information apparatus according to the present invention.

FIG. 4 is a block diagram showing a configuration of a portable information apparatus used in a CDMA mobile communication system as an embodiment of the present invention.

As shown in FIG. 4, the portable information apparatus comprises an antenna 7, a front end 8, a inverse diffusing circuit 9, a detecting/demodulating circuit 10, and a received power detection circuit 11. The antenna 7 and the front end 8 receive a radio wave in a down channel arrived from any one of base stations to output the received signal Sin in the received radio wave to the inverse diffusing circuit 9 and the received power detection circuit 11. The inverse diffusing circuit 9 inverse-diffuses the received signal Sin, the detecting/demodulating circuit 10 detects the inverse-diffused signal and further decodes the detected signal to produce a demodulated signal. The received power detection circuit 11 automatically measures power of the received signal Sin and supplies a measured power value P to a candidate base station selecting section 16 which will be described later.

The portable information apparatus is further provided with a GPS (Global Positioning System) reception antenna 12, a GPS reception circuit 13, a present location storing section 14, a traveling direction estimating section 15, a map data storing section 17, an operation portion 18, and the previously described candidate base station selecting section 16.

The GPS reception antenna 12 and GPS reception circuit 13 receive, every fixed time interval of $\tau$, a radio wave transmitted from each GPS satellite, and output present location data R(x, y) representing a present location (a longitude x and latitude y) of the portable information apparatus in synchronism with the time interval $\tau$.

The present location storing section 14 stores the newest present location data R(x, y) supplied from the GPS reception circuit 13.

The operation portion 18 is mounted on a side face of the portable information apparatus and has a plurality of operating button switches. When a user operates specified button switches to input information indicating a destination (name of a public building such as Tokyo station or a place) as destination data DOB, the destination data DOB is then supplied to the traveling direction estimating section 15. The operation portion 18 can be also operated by a voice input instead of the button switch operation.

The map data storing section 17, there are stored map data beforehand for showing a map of Japan, road maps, location data of names of places or buildings together with those indicating locations thereof. The location data also includes base station location data BSi (x, y) indicating a latitude and longitude of each base station is settled in every service area.

The traveling direction estimating section 15 carries out estimation of a direction in which the user is going to travel (a traveling direction) by deriving a deflection angle Om on the basis of the destination data DOB supplied from the operation portion 18 and the present location data R(x, y) stored in the present location storing section 14. The estimation data Dm representing the derived deflection angle $\theta$m is supplied to the candidate base station selecting section 16.

Figure 5:
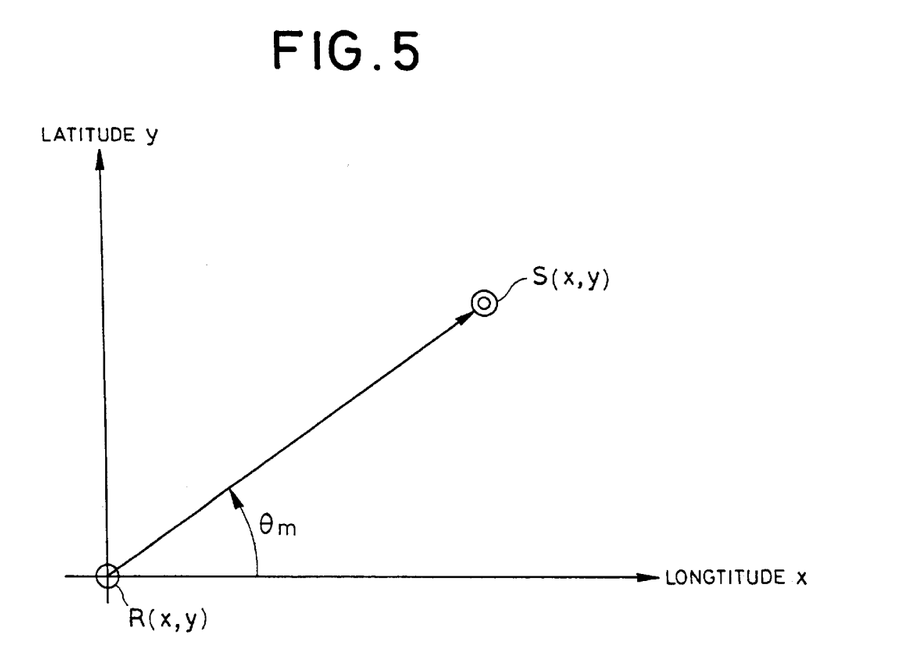
FIG. 5 is a diagram showing an estimation of a destination deflection angle.

More specifically, when the destination data DOB about a name of destination such as "Tokyo station" is supplied from the operation portion 18 by the user inputting the data, the traveling direction estimating section 15 searches the map data storing section 17 on the basis of the destination data DOB and extracts the destination location data S(x, y) represented by the longitude and latitude of the destination from the above location data. Furthermore, as schematically shown in FIG. 5, an orthogonal coordinate system with the present location data R (x, y) at the origin is determined, in which coordinate axes represent the longitude x and latitude y, respectively. In the coordinate system, an angle Em (deflection angle) between the x-axis and a vector, with an initial point thereof at a point represented by the present location data R(x, y) and an terminal point thereof at a point represented by the destination location data S(x, y), is taken as representing an estimated direction in which the user is going to travel. Then, estimation data Dm representing the angle θm (hereinafter referred to as destination deflection angle) is supplied to the candidate base station selecting section 16.

On the basis of the present location data R(x, y), the candidate base station selecting section 16 retrieves, from the map data storing section 17, the base station location data BSi(x, y) about all of the base stations in an area within a specified radius (several kilometer, for example) centered at the present location of the mobile unit. Namely, as schematically shown in FIG. 6, in the orthogonal coordinate system with the coordinate axes representing the longitude x and latitude y, respectively, the candidate base station selecting section 16 extracts the base station location data BSi(x, y) which represent the locations of all of the base stations BSa to BSe in an area within a specified radius with the center thereof at the present location data R(x, y) when the present location data R(x, y) is at the origin point.

The candidate base station selecting section 16 further carries out arithmetic operations to obtain a deflection angle θci (hereinafter referred to as base station deflection angle) between the x-axis and a vector with an initial point thereof at a point represented by the present location data R(x, y) and a terminal point thereof at a point represented by each of the base station location data BSi(x, y). Each of the obtained base station deflection angles θci is compared with the destination deflection angle θm to select a base station corresponding to one of the base station deflection angles θci close to the destination deflection angle θm as a candidate base station suited for the communication with the portable communication apparatus.

Figure 6:
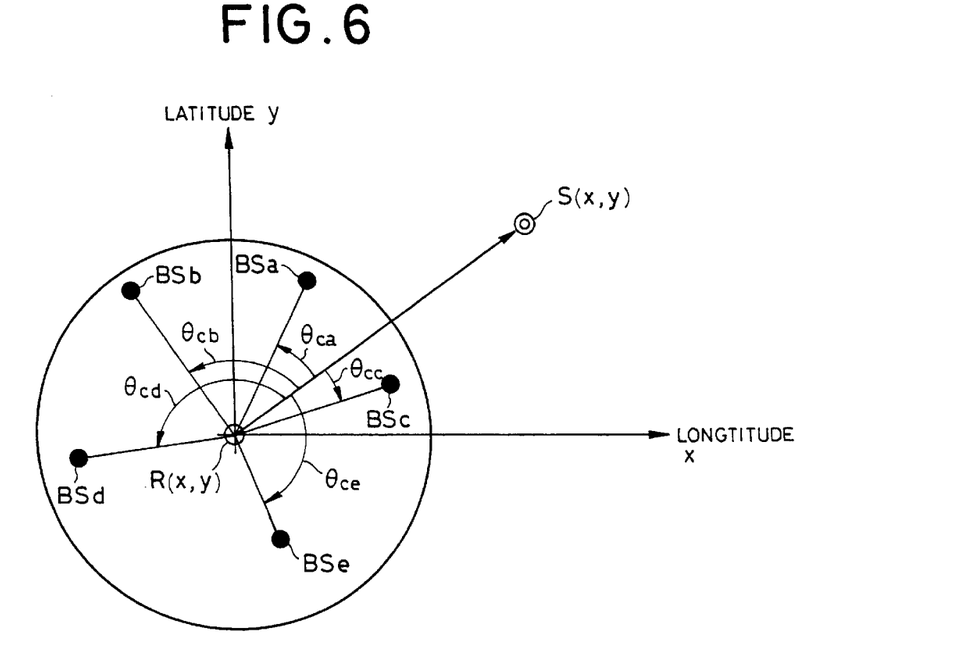
FIG. 6 is a diagram showing extraction of base stations in an area with a specified radius centered at a present location and a deflection angle of each of the base stations.

More specifically, as shown in FIG. 6, for a plurality of the base stations BSa to BSe being found, an arithmetic operation is carried out for the base station deflection angles θca to θce between the x-axis and vectors with initial points thereof at a point represented by the present location data R(x, y) and terminal points thereof at points represented by the base station location data BSa(xa, ya) to BSe(xe, ye), respectively. Furthermore, an arithmetic operation is carried out on the basis of following expression (1) or (2) for obtaining differences Δθcam to Δθcem between the base station deflection angles θca to θce and the destination deflection angle θm, respectively:

$$\Delta\theta cim = |\theta ci - \theta m| \text{ (where, } \Delta\theta cim \leq 180°\text{)} \quad (1)$$

$$\Delta\theta cim = (|\theta ci - \theta m|) - 360° \text{ (where, } \Delta\theta cim > 180°\text{)} \quad (2)$$

Figure 9A:
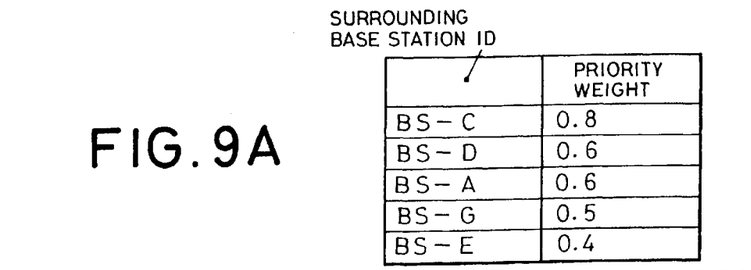
FIG. 9A is an example of a table showing a priority weight of each base station.

In order to find a base station corresponding to one of the base station deflection angles θci close to the destination deflection angle θm as candidate base stations suited for communication, an arithmetic operation is carried out for each of the base stations so as to obtain a weighting coefficient represented by following expression (3). Each of the results is arranged in a candidate base station table shown in FIG. 9A. The candidate base station table is constituted with a surrounding base station ID and a priority weight value as a result of an arithmetic operation of the weighting coefficient for each surrounding base station ID as one pair. The table is formed in a RAM (not shown) in the traveling direction estimating section 15 shown in FIG. 4 to be stored therein:

$$Bsi \text{ weight} = 1 - (\Delta\theta cim/180°) \times a \text{ } (a=0.5, \text{ for example}) \quad (3)$$

As is understood from the above expressions, a criterion of selecting candidate base stations suited for communication is established so as to decide that base stations behind the traveling mobile unit are unsuitable and to strictly select only base stations approximately in the traveling direction for a candidate base station. When a plurality of base stations are selected in accordance with the base station deflection angles θci, respective priorities thereof are given by the above weighting coefficients to select one candidate base station.

Figure 7:
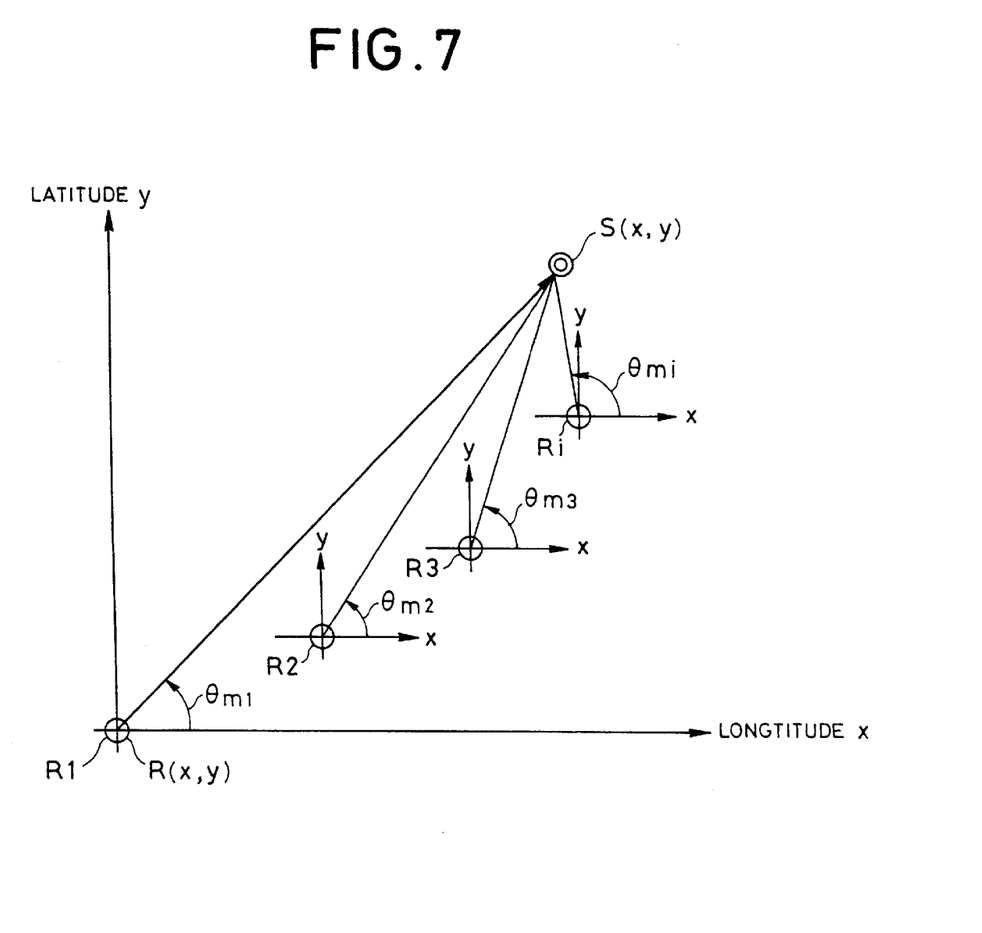
FIG. 7 is a schematic diagram showing a transition of a destination deflection angle with traveling of the portable information apparatus.
Figure 8:
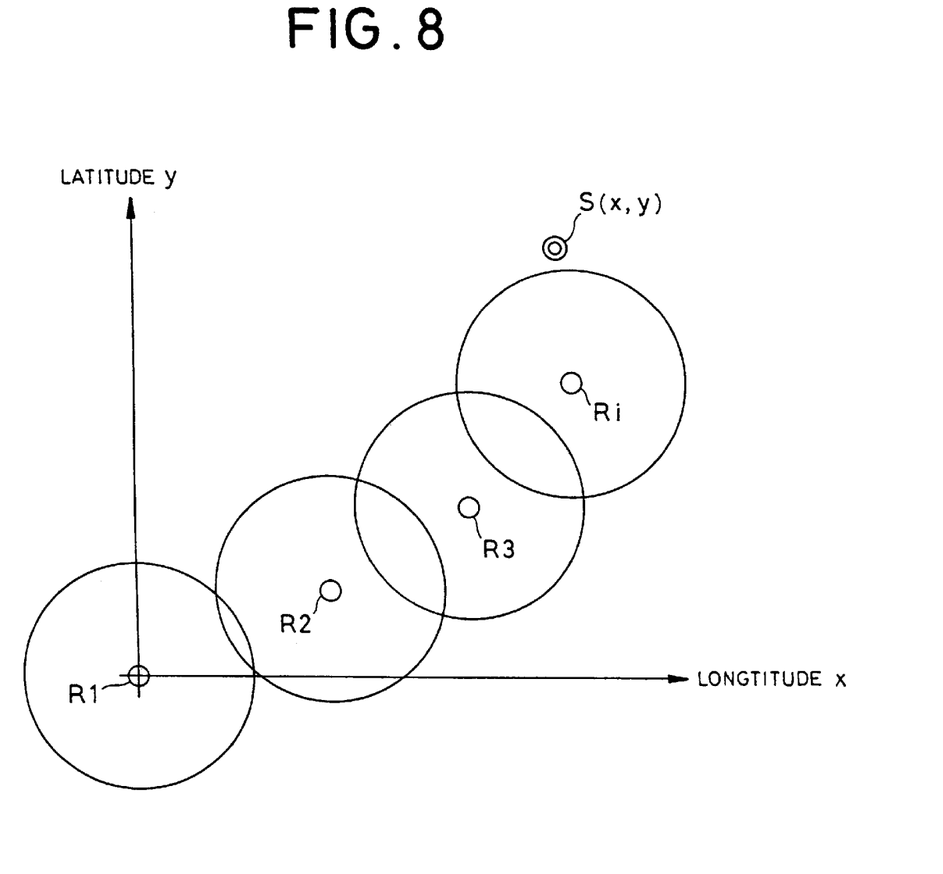
FIG. 8 is a schematic diagram showing transitions of present location data and an area having a specified radius, respectively, with traveling of the portable information apparatus.

The above operation is repeated for every traveling of the portable information apparatus equal to or more than a definite distance. Thus, the candidate base station table is always updated with the newest content. FIG. 7 and FIG. 8 show a transition of the destination deflection angle θ (θml to θmi), and a transition of the present location data R (R1 to Ri) with an area having a specified radius, respectively, with traveling of the portable information apparatus.

Figure 9B:
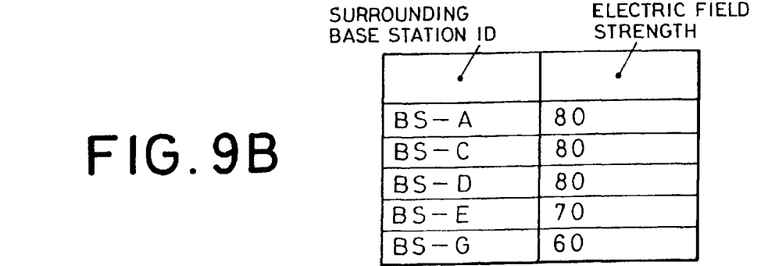
FIG. 9B is an example of a table showing an electric field strength of each base station.

The candidate base station selecting section 16 further extracts the base stations transmitting radio waves with such an electric field strength that the portable information apparatus can be handed over. FIG. 9B is a table showing a measured value of an electric field strength for each of the extracted surrounding base station IDs. Here, an electric field strength of each of the surrounding base station can be distinguished by identifying an ID in a demodulated signal with the ID stored in the table.

Figure 9C:
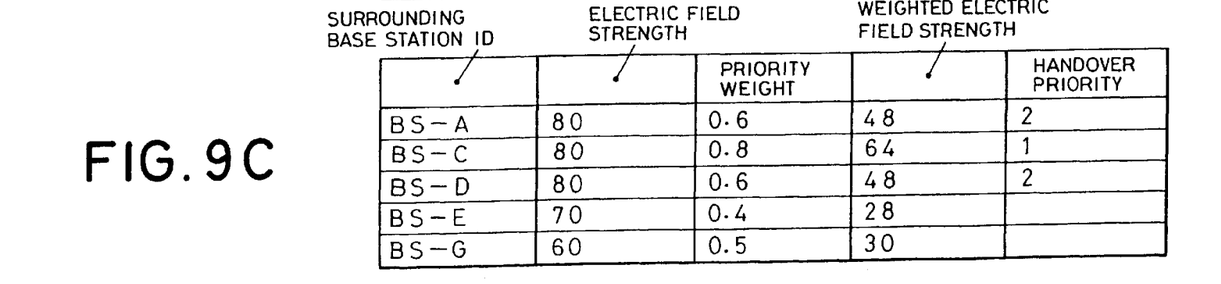
FIG. 9C is an example of a table showing an electric field strength, priority weight, a weighted electric field strength, and a priority of handover of each base station.

In addition, in the candidate base station selecting section 16, the candidate base station table is read out from the RAM in the traveling direction estimating section 15. Then, an arithmetic operation is carried out for weighting the measured electric field strength for each of the base station ID by multiplying the previously measured electric field strength value with the priority weight in the read out candidate base station table. FIG. 9C is a table showing thus obtained weighted electric field strength for each of the surrounding base station IDs. The candidate base station selecting section 16 selects a base station to be handed over in order of magnitude of thus weighted electric field strength value, and executes hand over. Here, BSc is the base station with the highest priority to be handed over.

In the example shown in the table in FIG. 9C, the highest priority is given to the base station with numeral 1 to which the portable information apparatus is handed over. When a plurality of the base stations can be selected as in the CDMA system, the base stations with numeral 2 can be selected in addition to the station with numeral 1.

Figure 10:
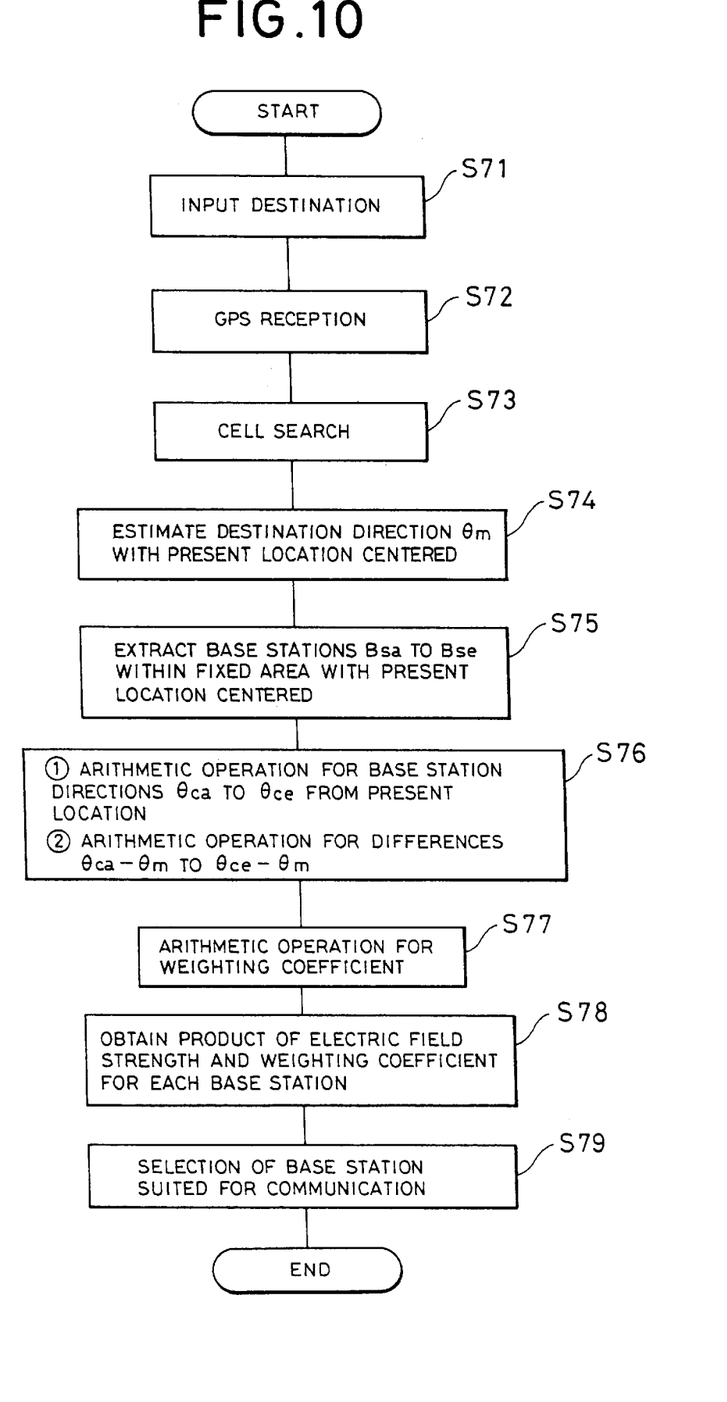
FIG. 10 is a flow chart showing a process of operation in selecting a base station.

FIG. 10 is a flow chart showing the above described operation for the base station selection. The operation of the portable information apparatus shown FIG. 4 will be explained with reference to the flow chart shown in FIG. 10. First, the user turns on the power source of the portable information apparatus before inputting a destination by a button switch operation or a voice input operation (step S71). The GPS receiving circuit 13 receives a radio wave transmitted from each satellite at a fixed time interval to measure the present location for updating the stored content of the present location storing section 14 for every reception of the radio wave (step S72). In addition, the candidate base station selecting section 16 carries out cell search operation (step S73) to measure an electric field strength of each base station.

The traveling direction estimating section 15 carries out estimation of the direction in which the user is going to travel. In the estimation, an orthogonal coordinate system is first determined in which the x and y axes representing longitude and latitude, respectively. Then, the estimated direction is obtained as being represented by an angle θm (the destination deflection angle) between the x-axis and a vector with an initial point thereof at a point represented by the present location data and a terminal point thereof at the destination location data. The destination location data is input by the user and the present location data is stored in the present data storing section 14. The destination deflection angle θm is supplied as data to the candidate base section selecting section 16 (step S74). The candidate base station selecting section 16 retrieves, from the map data storing section 17, the base station location data BSa to BSe about all of the base stations in an area within a specified range centered at the present location (step S75). Then, an arithmetic operation is carried out for angles (the base station deflection angles θca to θce) between the x-axis and vectors each with an initial point thereof at a point represented by the present location data and a terminal point thereof at a point represented by each of the obtained base station location data, respectively (step S76). Furthermore, an arithmetic operation is carried out for obtaining differences between the obtained base station deflection angles and the destination deflection angle, respectively (obtain differences Δθcam=θca−θm to Δθcem=θce−θm from the above expression (1) or (2)). Following the operation, an arithmetic operation is further carried out about each of the base stations to obtain a weighting coefficient therefor (obtain BSi weight by expression (3)) for finding at least one base station having the base station deflection angle close to the destination deflection angle as a candidate base station suited for communication (step S77).

The candidate base station selecting section 16 further carries out an operation to weight the electric field strength of each of the surrounding base stations with the result of the previous arithmetic operation for the weighting coefficient (step S78: multiplies the electric field strength value by the weighting coefficient) to thereby select a base station suited for communication. That is, a base station with a higher weighted electric field strength that is weighted by the weighting coefficient is selected as being of higher priority. To the selected base station with a higher priority, the portable information apparatus is connected (step S79) for a followed normal communication or handover. Each of the above process of steps S71 to S79 is repeated at a specified time interval.

In the above embodiment, an explanation was made about the case where the present invention is applied to a CDMA system using a Direct Sequence (DS) method. The present invention, however, is not limited to this, but can be also applied to a CDMA system using a Frequency Hopping (FH) method. Furthermore, the present invention is applicable to not only the CDMA system but also an FDMA (Frequency Division Multiple Access) system and a TDMA (Time Division Multiple Access) system. In addition, the present invention can also be applicable to any one of digital and Analog communications.

Although the embodiment was explained about reception of a signal modulated by PSK (Phase shift Keying), the invention can be applied to reception of signals with other modulations such as ASK (Amplitude Shift Keying), OOK (On-Off Shift Keying) and FSK (Frequency Shift Keying). Furthermore, the present invention is not limited to the above embodiment which was explained as a mobile unit with a cellular portable information apparatus mounting a navigation system including map information. Thus, the mobile unit can be constituted so that the navigation system includes the cellular portable information apparatus, or each of them is provided separately.

As described above, according to the present invention, a base station most suited for communication can be selected and therefore unnecessary handover can be eliminated. This prevents the apparatus from waste of resource to improve quality of communication. Namely, a selection of a base station or handover is carried out on the basis of the traveling direction of the mobile unit detected by arithmetic operation with present location data and destination data. Therefore, even if down channel signals from a plurality of base stations are received in the same level with some of them being arrived due to reflection, a base station in the traveling direction can be selected which is most suited for communication or handover to eliminate unnecessary hand over. In addition, by monitoring electric field strength and reception quality of radio wave, unstable handover to an unsuitable base station due to reception of a reflected wave can be prevented. This improves speech communication quality without undesirable disconnection.

What is claimed is:

1. A mobile communication apparatus which selects any one of a plurality of base stations to communicate therewith, comprising:
    extracting means for extracting surrounding base stations of a mobile unit within a certain defined area centered at a present location of said mobile unit; and
    base station selecting means for carrying out an arithmetic operation for obtaining a specified weighting coefficient with respect to each of said extracted surrounding base stations on the basis of a direction of each of said extracted surrounding base stations from said present location of said mobile unit and a traveling direction of said mobile unit, for carrying out further arithmetic operation for weighting a value of said electric field strength of a signal received from each of said surrounding base stations with said weighting coefficient of a corresponding surrounding base station to provide a weighted electric field strength of each of said extracted surrounding base station, and for selecting said one base station from said extracted surrounding base stations depending on a value of said weighted electric field strength.

2. A mobile communication apparatus as claimed in claim 1 further comprising:
    present location detecting means for detecting said present location of said mobile unit;
    traveling destination inputting means for inputting a traveling destination of said mobile unit; and
    traveling destination direction estimating means for estimating a traveling destination direction of said mobile unit with said present location detected by said present location detecting means and said traveling destination input to said traveling destination inputting means.

3. A mobile communication apparatus as claimed in claim 2 wherein said base station selecting means is for carrying out an arithmetic operation for:
    obtaining a direction of each of said extracted surrounding base stations extracted by said extracting means from said present location and each of locations of said extracted surrounding base stations obtained by said extracting means;
    carrying out a comparison of said obtained direction of each of said extracted surrounding base stations and said traveling destination direction as said traveling direction; and obtaining said weighting coefficient for each of said extracted surrounding base stations which is provided so that said extracted surrounding stations in directions nearer said traveling destination direction are more largely weighted.

4. A mobile communication apparatus as claimed in claim 2 wherein said traveling destination direction estimating means is for carrying out an arithmetic operation for making said traveling destination direction as a direction of a vector with an initial point thereof at a point represented by data of said present location of said mobile unit detected by said present location detecting means and a terminal point thereof at a point represented by data of said destination location data obtained through said traveling destination inputting means, said traveling destination direction being defined as a destination deflection angle which is an angle between said vector and an axis of a coordinate system determined for location.

5. A mobile communication apparatus as claimed in claim 2 wherein said base station selecting means carries out an arithmetic operation for:

obtaining a direction of each of said extracted surrounding base stations as a direction of a vector with an initial point thereof at a point represented by said present location data of said mobile unit detected by said present location detecting means and a terminal point thereof at a point represented by data of a location of each of said surrounding base stations extracted by said extracting means, said direction of said extracted surrounding base station being defined as a base station deflection angle which is an angle between said vector and an axis of a coordinate system determined for location;

obtaining a difference of each of said base station deflection angles and said destination deflection angle; and obtaining said weighting coefficient including said difference which is provided so that a base station with said difference being smaller has a higher priority of being made as a candidate of said one base station, and provides a table of candidate base stations with a set of base station IDs and said obtained weighting coefficients.

6. A mobile communication apparatus as claimed in claim 5 wherein said base station selecting means further measures a level of an electric field strength of a radio wave of each of said surrounding base stations to find candidate surrounding base stations each transmitting a radio wave with a level of an electric field strength allowing communication including handover; carries out an arithmetic operation of weighting a value of said measured electric field strength of each of said radio wave with said weighting coefficient with reference to said table of candidate base stations to provide a weighted electric field strength; and selects a base station having a large value of said weighted electric field strength as said one base station.

7. A mobile communication apparatus which selects any one of a plurality of base stations to communicate therewith, comprising:

a receiving section for receiving a radio wave transmitted from a satellite at a fixed time interval, and for outputting present location data in synchronism with said time interval;

a present location storing section for storing said present location data supplied from said receiving section;

an operation section into which location information indicating a destination is input as destination data by a user;

a map information storing section for storing map information including location data of each of base stations settled in each of service areas;

a traveling direction estimating section for estimating a traveling direction in which said user is going to travel, and for outputting said estimated direction as estimation direction data; and a candidate base station selecting section which receives said estimation direction data output from said traveling direction estimating section; retrieves base station location data about all of said base stations in an area within a specified radius centered at the present location from said map data storing section on the basis of said present location data; carries out an arithmetic operation for obtaining a direction of each of said base stations as a direction of a vector with an initial point thereof at a point represented by said present location data and a terminal point thereof at a point represented by a retrieved base station location data of each of said base stations, said direction of said vector being defined as a base station deflection angle which is an angle between said vector and said axis of said coordinate system;

carries out an arithmetic operation for comparing each of said obtained base station deflection angles with said destination deflection angle, for obtaining weighting coefficients each corresponding to each of said base stations and providing a higher priority of being made as a candidate of said one base station for a base station with said base station deflection angle closer to said destination deflection angle, and for weighting a value of an electric field strength of a signal received from each of surrounding base stations with said corresponding weighting coefficient to provide a weighted electric field strength for each of base stations; and selects said one base station depending on a value of said weighted electric field strength.

8. A method for communication used in a mobile communication system which selects any one of a plurality of base stations to communicate with a mobile unit, said method comprising the steps of:

inputting a traveling destination of said mobile unit;

detecting a present location of said mobile unit at a fixed time interval;

carrying out an arithmetic operation for obtaining a weighting coefficient for each of base stations, said weighting coefficient being provided so that a base station at the shortest distance from said mobile unit in a traveling direction thereof is made as a candidate of said one base station;

carrying out an arithmetic operation for weighting a value of an electric field strength of a signal received from each of surrounding base stations with said corresponding weighting coefficient to provide a weighted electric field strength for each of base stations; and selecting said one base station depending on a value of said weighted electric field strength.

9. A method for communication as claimed in claim 8 wherein:

a direction of said traveling destination is estimated from said present location of said mobile unit;

surrounding base stations within a specified area centered at said present location are extracted to carry out an arithmetic operation for obtaining a direction of each of said extracted surrounding base stations from the present location;

an arithmetic operation is carried out for comparing said obtained direction of each of said base stations with said direction of said traveling destination, for obtaining weighting coefficients each providing a higher priority of being made as a candidate of said one base station for a base station with said direction of said base station closer to said direction of said traveling destination, and for weighting a value of an electric field strength of a signal received from each of surrounding base stations with said corresponding weighting coefficient to provide a weighted electric field strength for each of base stations; and a base station is selected as said one base station depending on a value of said weighted electric field strength.

* * * * *